United States Patent
Hiraguchi

(10) Patent No.: US 6,883,740 B2
(45) Date of Patent: Apr. 26, 2005

(54) TAPE DRIVE DEVICE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 87 days.

(21) Appl. No.: 10/356,627

(22) Filed: Feb. 3, 2003

(65) Prior Publication Data

US 2003/0146326 A1 Aug. 7, 2003

(30) Foreign Application Priority Data

Feb. 1, 2002 (JP) ........................................ 2002-025630

(51) Int. Cl.[7] .............................................. B65H 18/08
(52) U.S. Cl. .................................. 242/332.4; 242/532.2
(58) Field of Search ............................ 242/332.4, 332, 242/332.3, 532, 532.2; 360/95

(56) References Cited

U.S. PATENT DOCUMENTS

| | | | | |
|---|---|---|---|---|
| 3,127,120 A | * | 3/1964 | Selsted et al. ........... | 242/332.3 |
| 3,134,527 A | * | 5/1964 | Willis ....................... | 242/332.3 |
| 3,393,878 A | * | 7/1968 | Aweida ................... | 242/332.3 |
| 3,398,913 A | * | 8/1968 | Orlando ................... | 242/332.3 |
| 3,643,890 A | * | 2/1972 | Milligan et al. ......... | 242/332.3 |
| 3,795,371 A | * | 3/1974 | Tolini et al. ............. | 242/332.3 |
| 3,863,863 A | * | 2/1975 | Ende ....................... | 242/332.3 |
| 4,243,186 A | * | 1/1981 | Peter et al. .............. | 242/332.3 |
| 4,328,066 A | | 5/1982 | Kiuchi et al. | |
| 4,620,678 A | * | 11/1986 | Kumakura et al. ...... | 242/332.3 |

* cited by examiner

Primary Examiner—William A. Rivera
(74) Attorney, Agent, or Firm—Sughrue Mion, PLLC

(57) ABSTRACT

In a tape drive device of the present invention, a large number of through-holes (an sucking portion) are formed in an outer peripheral portion of a reel hub onto which a recording tape, at a free end of which a leader tape is connected, is to be wound. The leader tape is held and guided by guiding means. When the leader tape reaches the sucking portion, a suction device operates and air is sucked through the through-holes. Consequently, the leader tape is suckingly retained at the outer peripheral surface of the reel hub. With the present invention, there is no need to form depressions or projections for accommodating and anchoring the leader tape at the reel hub. Therefore, the reel hub can have a smooth structure without any steps.

17 Claims, 12 Drawing Sheets

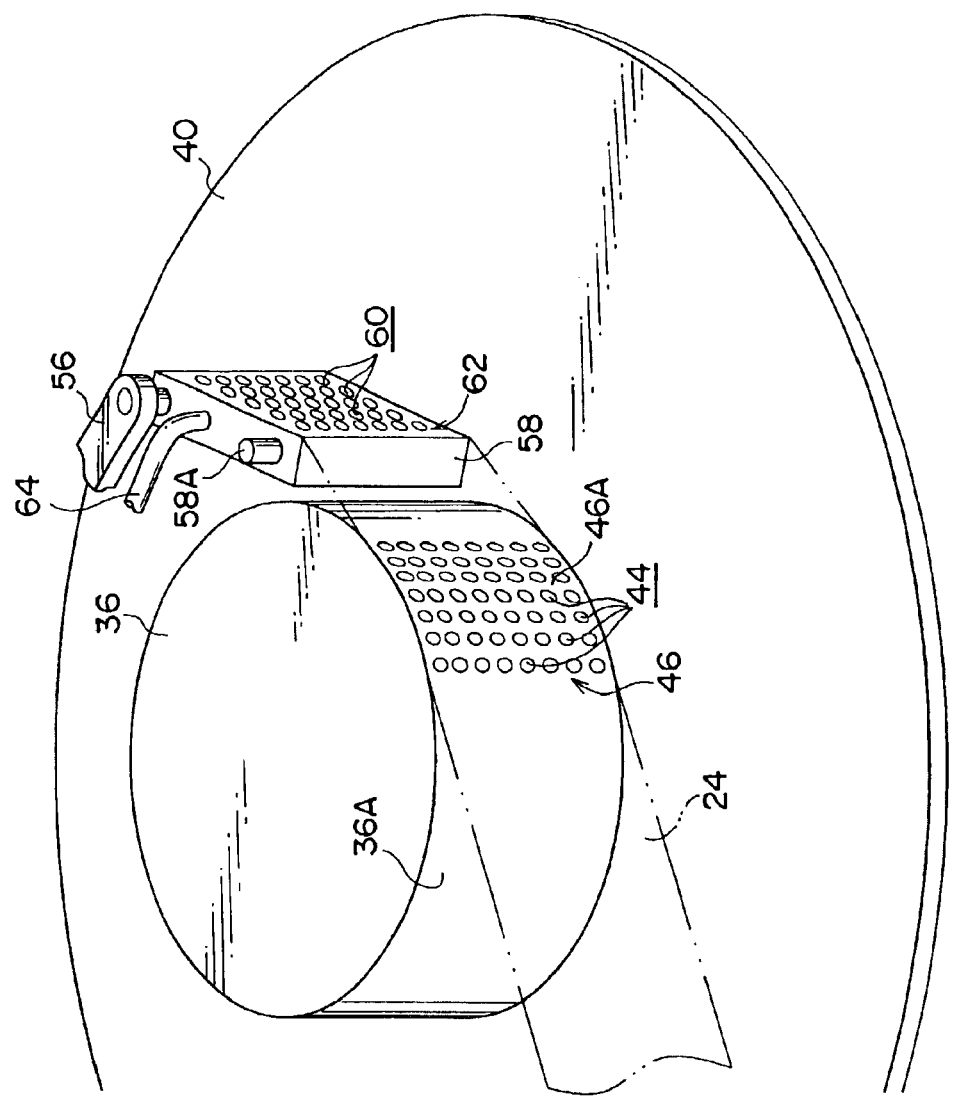

TAPE DRIVE DEVICE

BACKGROUND OF THE INVENTION

1. Field of the Invention

The present invention relates to a tape drive device which, while winding a recording tape that has a free end onto a winding reel, carries out recording of information to the recording tape and/or replaying of information recorded on the recording tape.

2. Description of the Related Art

Recording tapes such as magnetic tapes and the like are used as external recording media for computers and the like. For such recording tapes, recording tape cartridges that accommodate a single reel on which a recording tape is wound, take up little accommodation space when stored and can record large amounts of information, are employed.

When such a recording tape cartridge is used, that is, when information is to be recorded onto the recording tape and/or information recorded on the recording tape is to be replayed, the recording tape cartridge is loaded at a tape drive device. In the tape drive device at which the recording tape cartridge is loaded, a leader member attached at a free end (distal end) of the recording tape is drawn out of the case by drawing-out means (and guiding means).

The leader member is guided to a winding reel of the tape drive device by the drawing-out means, and the recording tape is wound up on this winding reel while being sequentially drawn out from the case. Hence, recording/replaying of information is carried out by a recording head or the like which is provided along a predetermined tape path.

While the recording tape is being wound up on the winding reel of the tape drive device, the leader member attached at the distal end of the recording tape is accommodated inside a reel hub which forms a winding surface of the winding reel.

Specifically, in a structure in which a block-like leader block is used as the leader member, the leader block is inserted into an insetting portion which is formed as a slit provided along a radial direction of the reel hub. In this state, an end surface of the leader block structures a portion of the winding surface of the reel hub. This end surface of the leader block is curvedly formed in an arc shape corresponding to the outer surface of the reel hub, so that the recording tape can be wound smoothly.

However, in a tape drive device provided with this conventional leader member-accommodating structure, the leader block structuring the portion of the winding surface is a structural member of the recording tape cartridge. In other words, this portion of the winding surface is structured by a different leader block for each recording tape cartridge that is loaded. As a result, individual differences, in terms of dimensional accuracy, of the leader blocks are conspicuous at the tape drive device side, and a step that cannot be tolerated may be formed at the winding surface of the reel hub.

Such a step may cause a step (with creasing or deformation) in the recording tape which is wound thereon, and this step is also generated at a portion of the recording tape wound in succeeding layers, which is substantially a recording region (i.e., a "tape impression" may occur). A portion of the recording tape at which such a tape impression (step) has occurred will not maintain a proper separation from the recording head when undergoing recording/replaying of information. Therefore, occurrence of a region at which information cannot be recorded and/or a loss of recorded information may be caused.

In particular, when an opening width of the insetting portion of the reel hub which accommodates the block-like leader block is large (for example, if a width of the recording tape is 12.7 mm, an opening width at an outer peripheral portion of around 12 mm for a reel hub with a diameter of 50 mm), the effect of individual differences between leader block dimensions will be large, and the possibility that the problem described above will occur is high.

Accordingly, a small cylindrical leader pin has been used as a leader member of a recording tape cartridge, in a structure in which a leader block is provided at a tape drive device side such that the leader block which hooks onto the leader pin is accommodated in a reel hub together with the leader pin. This leader block is a structure which is moved by, for example, a cam mechanism, an arm mechanism or the like which is provided with a pin which engages with a through-hole of the leader block. The leader block is moved from a position at which the leader block hooks onto the leader pin, which is accommodated in a case (the recording tape cartridge), to a position at which the leader block is accommodated at the reel hub.

In this structure, the leader block of the tape drive device structures a portion of a winding surface when the leader block is accommodated in an insetting portion of the reel hub. That is, the leader block and the reel hub structure the tape drive device and have a one-to-one correspondence. Therefore, individual differences in dimensional accuracy between recording tape cartridge side components, that is, leader pins, have no effect with regard to steps in the winding surface.

However, this leader block both structures drawing-out means and rotates integrally with the reel hub. Thus, when the leader pin and leader block are accommodated at the reel hub, the engagement of the pin of the cam mechanism or the like with the through-hole should be released such that the cam mechanism or the like does not interfere with rotation of the reel hub. Hence, the leader block becomes movable in the reel hub. That is, the leader block does not have a structure that abuts against the reel hub for being positioned. Moreover, the leader block is moved along a complex path corresponding to the predetermined tape path by a plurality of cam mechanisms, arm mechanisms or the like. Thus, displacement errors of the cam mechanisms, arm mechanisms and the like are aggregated. As a result, the leader block may be not accurately positioned in the reel hub.

Specifically, in this structure, because of the relatively poor positioning accuracy of the tape drive device side leader block relative to the reel hub, a step which causes a tape impression may occur at the winding surface, that is, between an opening periphery portion of the insetting portion of the reel hub and an end surface of the leader block.

SUMMARY OF THE INVENTION

In consideration of the circumstances described above, an object of the present invention is to provide a tape drive device which can structure a winding surface of a reel hub, onto which recording tape is wound, without a step.

In order to achieve the aforementioned object, a tape drive device for winding a recording tape with a free end on a reel hub and carrying out at least one of recording of information on the recording tape and replaying of information that has been recorded on the recording tape includes: guiding means for guiding a tape-form leader portion to an outer peripheral surface of the reel hub, the leader portion being provided at the free end of the recording tape; and sucking means provided at the reel hub, the sucking means being capable of sucking the leader portion to the outer peripheral surface.

In the tape drive device of the present invention, when the leader portion provided at the free end (distal end) of the recording tape is guided to the outer peripheral surface of the reel hub by the guiding means, the sucking means operates and sucks (adheres by suction) the leader portion to the outer peripheral surface of the reel hub.

Consequently, the leader portion is retained at the reel hub. When the reel hub (winding reel) is driven to rotate in this state, the tape drive device winds the recording tape onto the outer peripheral surface of the reel hub with the leader portion, while carrying out recording of information to the recording tape or replay of information that has been recorded at the recording tape.

The tape-form leader portion may be the recording tape itself, and may be a leader tape which is attached at the free end of the recording tape and has a higher strength than the recording tape, or the like.

Because the sucking means, which is capable of sucking the leader portion to the outer peripheral surface of the reel hub, is provided at the reel hub, the reel hub can retain the leader portion without accommodating the leader portion thereinside. Therefore, there is no need to provide unnecessary projections and depressions such as a recess portion or the like, which tend to cause steps, in order to accommodatingly retain the leader portion in an opening in the outer peripheral surface. Thus, the reel hub can have a structure in which the outer peripheral surface on which the recording tape is wound has a smooth (continuous) cylindrical surface.

In other words, because there is no member that enters into the reel hub and structures the winding surface together with the outer peripheral surface of the reel hub, a step in the winding surface onto which the recording tape is wound will not be caused by individual dimensional differences of such a member, positioning accuracy, or the like.

Accordingly, a tape drive device of the present invention can structure a winding surface onto which recording tape is wound, without a step.

BRIEF DESCRIPTION OF THE DRAWINGS

FIG. 7 is a perspective view showing a state at a time of commencement of sucking of the leader tape by the reel hub of the tape drive device relating to the embodiment of the present invention.

DESCRIPTION OF THE PREFERRED EMBODIMENTS

A tape drive device 10 relating to an embodiment of the present invention will be described. First, general structure of a recording tape cartridge 14 that is loaded at the tape drive device 10 will be described. The recording tape cartridge 14 is provided with a magnetic tape 12 at which recording/replaying of information is implemented. Thereafter, structure of the tape drive device 10 will be described.

General Structure of Recording Tape Cartridge

Figure 9:
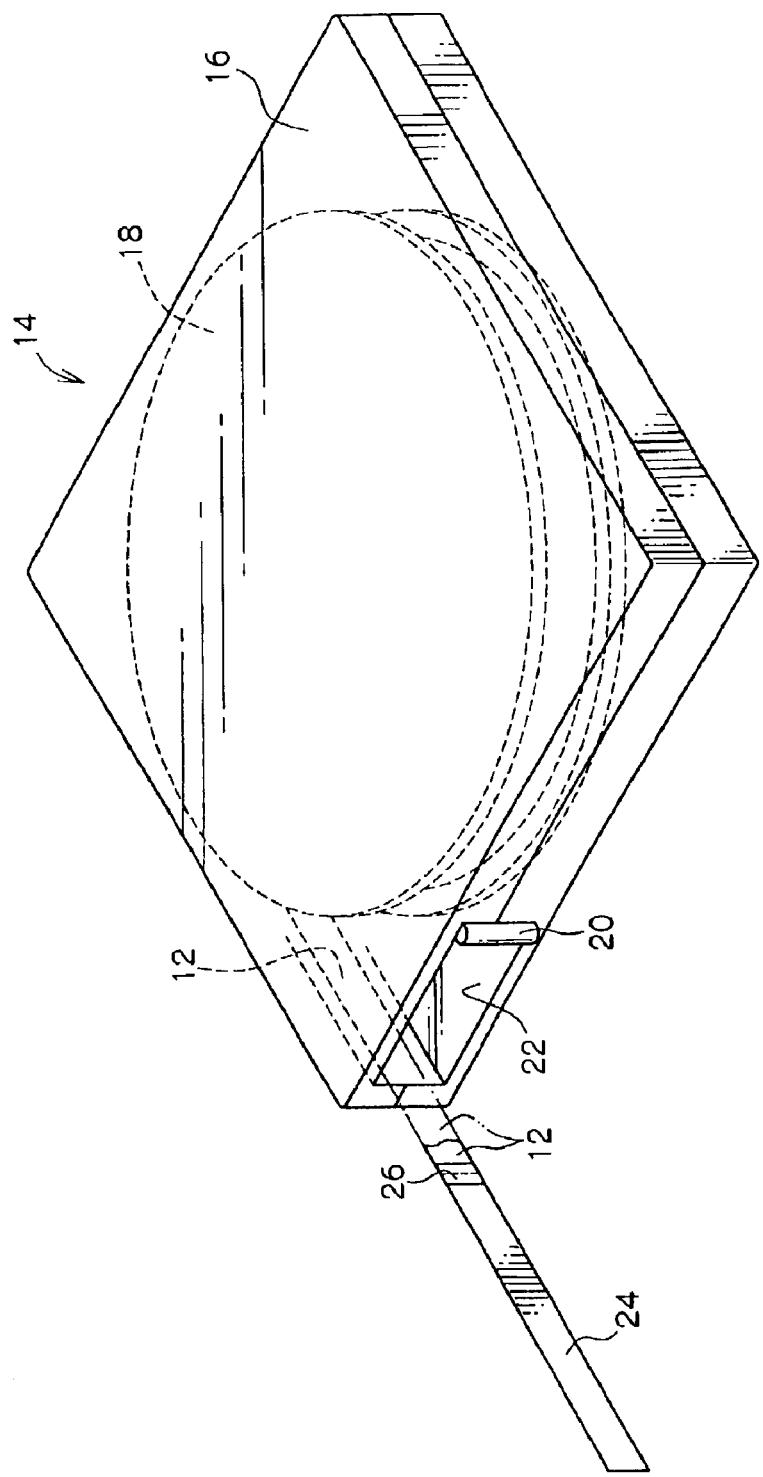
FIG. 9 is a perspective view showing schematic structure of a recording tape cartridge which is loaded at the tape drive device relating to the embodiment of the present invention.

FIG. 9 shows schematic overall structure of the recording tape cartridge 14 in sectional view. As is shown in this drawing, the recording tape cartridge 14 has a structure which rotatably accommodates a single reel 18, at which the magnetic tape 12 is wound up, in a case 16. The case 16 is substantially rectangular in plan view. The magnetic tape 12 serves as a recording tape, which is an information recording/replaying medium.

A gear aperture (not shown in any of the drawings) is formed in a lower face of the case 16. The gear aperture exposes a reel gear of the reel 18. The reel gear meshes with a driving gear of the tape drive device 10, and the reel 18 is driven to rotate in the case 16. The case 16 is also provided with an opening 22, which is opened and closed by a sliding door 20. The opening 22 is for drawing out of the magnetic tape 12.

A leader tape 24, which serves as a leader portion, is connected at a free end (distal end) of the magnetic tape 12. The leader tape 24 is formed by a resin member, thin metallic film or the like, whose thickness is equal to or greater than the thickness of the magnetic tape 12 (for example, for a magnetic tape thickness of from 6 $\mu$m to 20 $\mu$m, the leader tape 24 thickness is from 20 $\mu$m to 30 $\mu$m), and the leader tape 24 has higher strength than the magnetic tape 12.

The leader tape 24 is formed in a tape shape with the same width as the magnetic tape 12. Width direction end portions (longitudinal directions) of the leader tape 24 and the magnetic tape 12 are set to match one another. In addition, the leader tape 24 and the magnetic tape 12 are connected by a splicing tape 26, which is an adhesive (fastening) tape. The splicing tape 26 is adhered at sides of the respective leader tape 24 and magnetic tape 12 that are substantially flush with each other at an outer peripheral side when the leader tape 24 and magnetic tape 12 are wound onto a reel hub 36 (described later). A length of the leader tape 24 is set to be the same as a circumferential length of the reel hub 36. A thickness of the splicing tape 26 is set from 15 μm to 30 μm.

General Structure of Tape Drive Device

Figure 1:
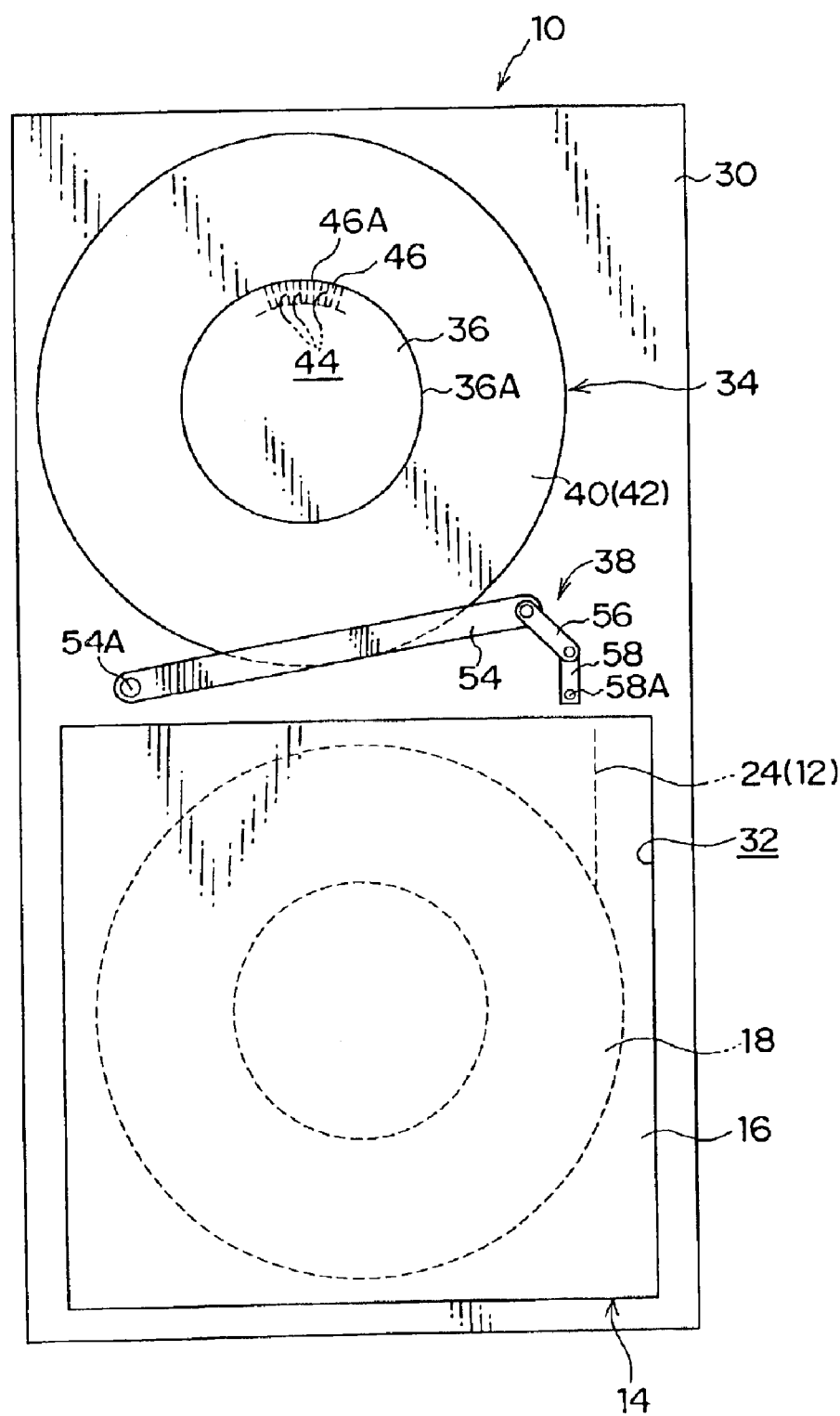
FIG. 1 is a plan view showing schematic overall structure of a tape drive device relating to an embodiment of the present invention.

FIG. 1 shows general structure of the tape drive device 10 in a state in which the recording tape cartridge 14 has been loaded therein, in plan view.

As shown in the drawing, the tape drive device 10 is structured with a main body 30, a cartridge accommodation portion 32, a winding reel 34, and guiding means 38. The cartridge accommodation portion 32 is provided at the main body 30. The magnetic tape 12 of the recording tape cartridge 14 is wound onto the winding reel 34. The guiding means 38 guides the leader tape 24, which is connected to the distal end of the magnetic tape 12, to the reel hub 36 of the winding reel 34.

Although not shown in the drawings, guide rollers are provided at the tape drive device 10. The guide rollers are supported by arm mechanisms or the like, and guide the magnetic tape 12 that is drawn out from the reel 18 of the recording tape cartridge 14 and wound onto the winding reel 34 along a predetermined tape path. The tape drive device 10 is also provided with a recording/replaying head, which is disposed along the predetermined tape path.

The recording tape cartridge 14 can be mounted and removed at the cartridge accommodation portion 32. The unillustrated driving gear is disposed downward of the cartridge accommodation portion 32. The driving gear meshes with the reel gear of the reel 18 of the recording tape cartridge 14, and can be driven to rotate the reel 18.

The winding reel 34 is rotatably supported at the main body 30. The winding reel 34 is driven to rotate by an unillustrated driving motor synchronous with the driving gear (and the reel 18). As a result of this rotation, the winding reel 34 winds the magnetic tape 12 onto an outer peripheral surface 36A of the reel hub 36, and sequentially draws the magnetic tape 12 out from the case 16.

Figure 2:
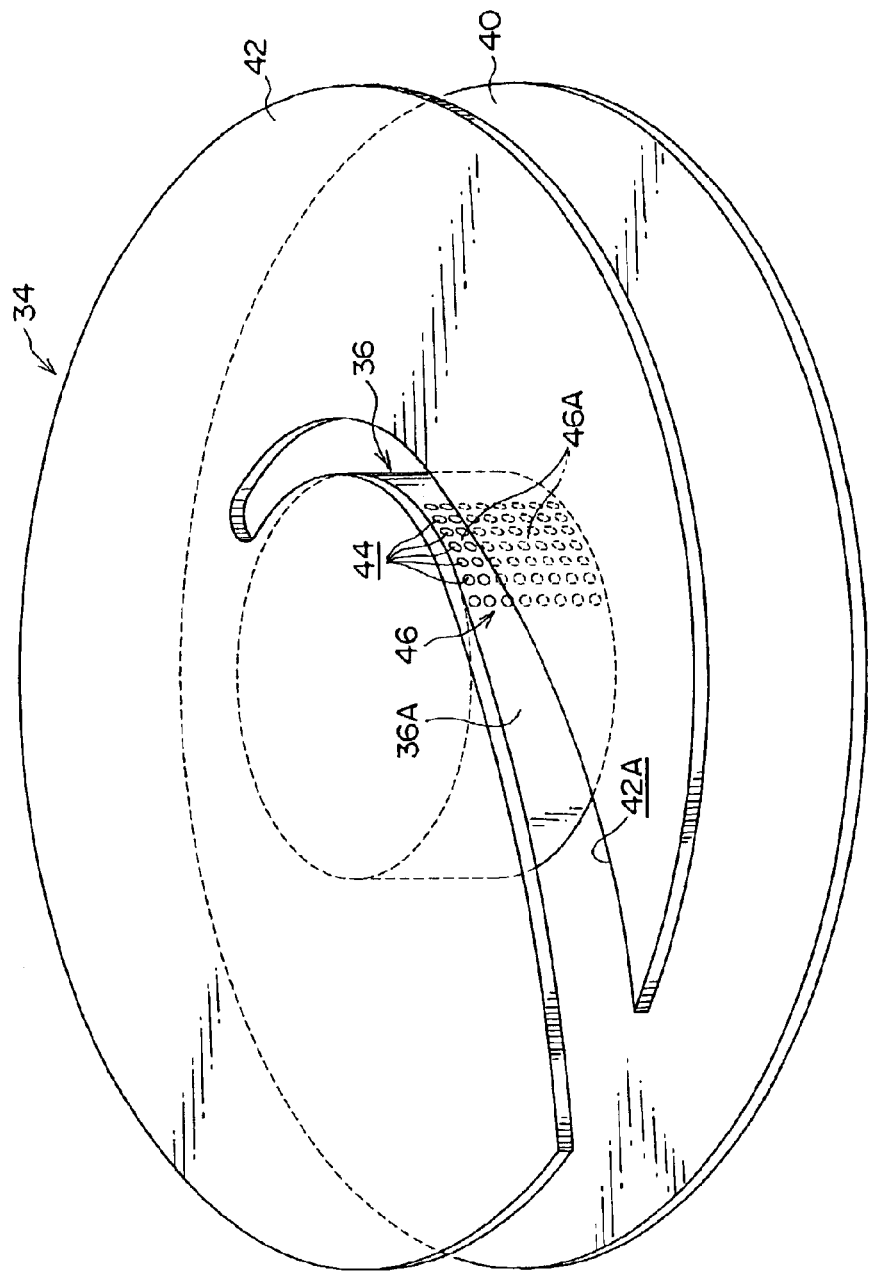
FIG. 2 is a perspective view showing a winding reel which structures the tape drive device relating to the embodiment of the present invention.
Figure 3:
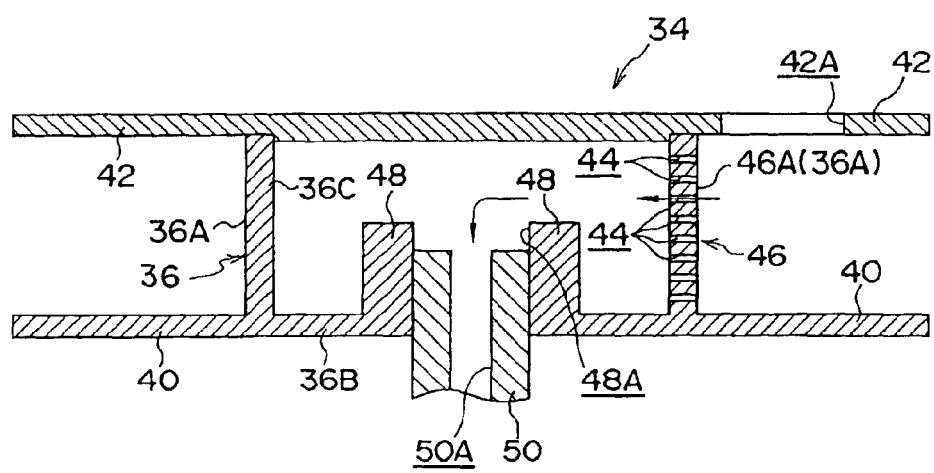
FIG. 3 is a sectional view showing the winding reel which structures the tape drive device relating to the embodiment of the present invention.

Below, details of the winding reel 34 will be described. FIG. 2 shows general overall structure of the winding reel 34 in a perspective view. FIG. 3 shows a sectional view of the winding reel 34. As shown in these drawings, the reel hub 36 of the winding reel 34 is formed substantially in the shape of a cylinder with a base. A lower flange 40 extends integrally from a radial direction outer side of this base (lower end portion) 36B.

A disc-like upper flange 42 is hermetically (in an airtight state) and coaxially attached to an upper end opening portion of the reel hub 36. A slit 42A is formed in the upper flange 42. The slit 42A is for a suction-retention member 58 (described later), which structures the guiding means 38, to access the outer peripheral surface 36A of the reel hub 36.

An sucking portion 46 is provided at a portion, in the peripheral direction, of a peripheral wall (a tubular part) 36C of the reel hub 36. The sucking portion 46 is structured with numerous closely arranged through-holes 44, which communicate between the interior and exterior of the reel hub 36. A range of the sucking portion 46 in a height direction thereof extends substantially over the whole height of the reel hub 36 (the peripheral wall 36C). When a below-described suction device 66 operates or the like, (at least a portion of) the leader tape 24 can be sucked, along the whole height thereof, to an outer peripheral face 46A (a portion of the outer peripheral surface 36A) of the sucking portion 46.

A boss portion 48 is provided at a central portion of the base 36B of the reel hub 36. One end portion of a rotation shaft 50, which transmits rotary force from the driving motor, meshes, splines or the like with a boss hole 48A of the boss portion 48, so that the rotation shaft 50 is connected thereto so as to rotate coaxially and integrally with the reel hub 36 in an airtight manner. The rotation shaft 50 is formed in a tubular shape, and an interior thereof serves as a suction path 50A, which communicates with the interior of the reel hub 36.

Another end portion of the rotation shaft 50 (the suction path 50A) is relatively rotatably connected so as to communicate with one end portion of suction piping 52 (a tube, hose, copper pipe or the like) by an unillustrated joint. The suction piping 52 is connected to a suction portion of the suction device 66; this is described later.

In the present embodiment, in an initial state (prior to commencement of drawing out of the magnetic tape 12), the winding reel 34 (the reel hub 36) is held at a position (phase angle) in a direction of rotation such that the outer peripheral face 46A of the sucking portion 46 faces to a side substantially opposite to a side at which the cartridge accommodation portion 32 is disposed (see FIG. 1).

Now, returning to FIG. 1, the guiding means 38 will be described. The guiding means 38 is provided with an arm 54. A support shaft 54A is provided at one end portion of the arm 54, and pivotally supports the arm 54 at the main body 30. The arm 54 is swung about the support shaft 54A by operation of an unillustrated driving mechanism. The arm 54 swings above the upper flange 42, and is structured such that a swinging path of the arm 54 does not interfere with the winding reel 34.

Another end portion of the arm 54 is connected with the suction-retention member 58 via a linking member 56. The suction-retention member 58 is set to have substantially the same height (length in an axial direction of the peripheral wall 36C) as the reel hub 36. The suction-retention member 58 is connected to the linking member 56 so as to hang down from a distal end thereof. Consequently, the suction-retention member 58 can access the outer peripheral surface 36A of the reel hub 36, while opposing the whole height of the outer peripheral surface 36A.

Figure 4:
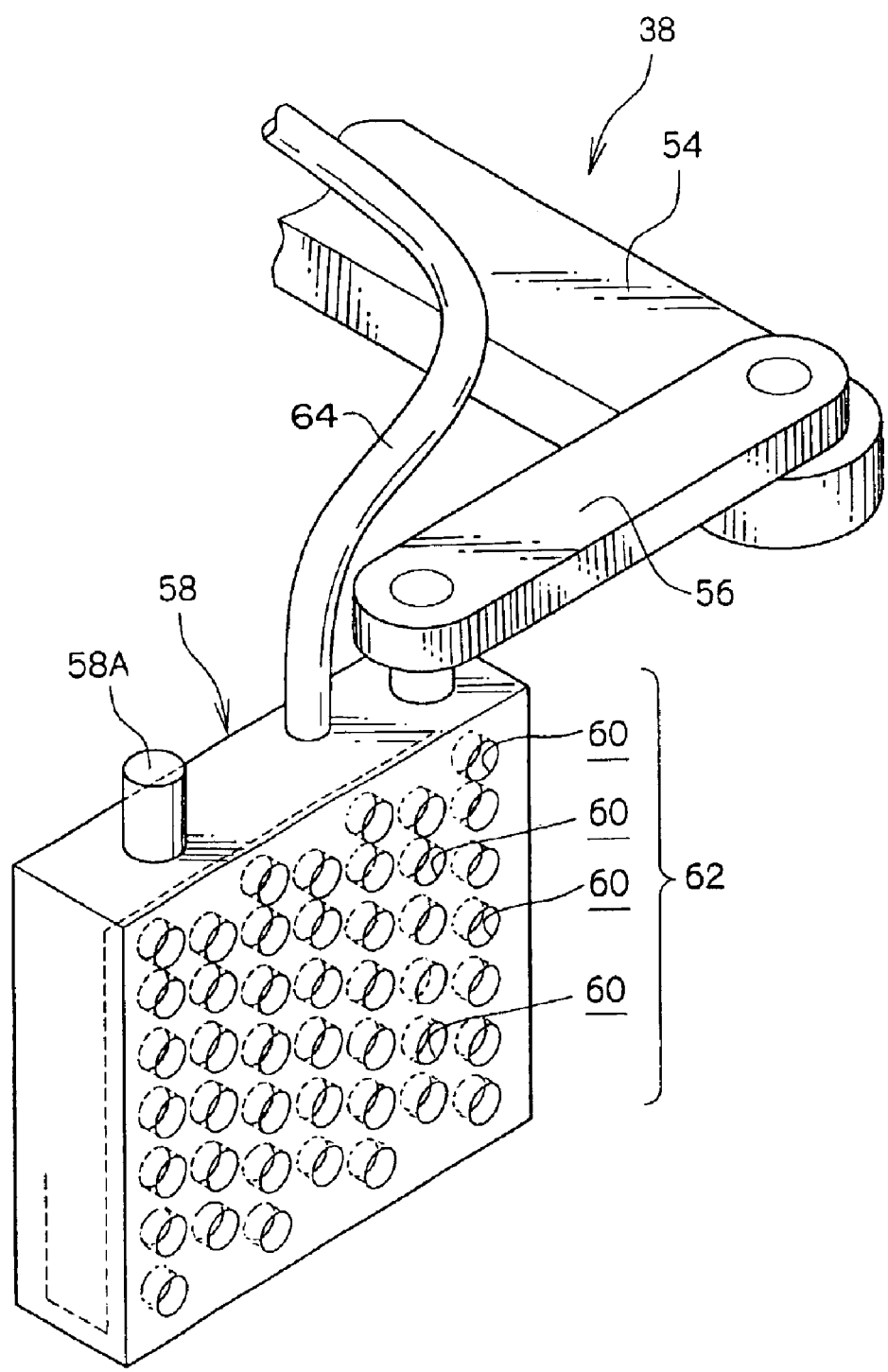
FIG. 4 is a perspective view showing a suction-retention member of guiding means which structures the tape drive device relating to the embodiment of the present invention.

As shown in FIG. 4, the suction-retention member 58 is formed in the shape of a hollow box-shaped receptacle. An sucking portion 62 is provided at a wall portion of one end side of the suction-retention member 58. The sucking portion 62 is structured with numerous closely arranged through-holes 60, which communicate between the interior and exterior of the suction-retention member 58. The suction-retention member 58 is communicated with the below-described suction device 66 via flexible suction piping 64 (formed by a flexible tube or the like), which is arranged along the arm 54. The leader tape 24 can be sucked to the sucking portion 62 by operation of the suction device 66 or the like. The suction piping 64 may be provided inside the arm 54 and the linking member 56 (that is, inside transfer members that move the suction-retention member 58).

A guide pin 58A is protrudingly provided at an upper end portion of the suction-retention member 58. The arm 54 is moved (swung) with the guide pin 58A inserted into an unillustrated cam groove, and is guided by the cam groove. Thus, the suction-retention member 58 moves along a predetermined path shown in FIG. 6. Specifically, the suction-retention member 58 is usually positioned at an initial position shown in FIG. 1. The suction-retention member 58 can then be moved, by swinging of the arm 54, between a position that is advanced into the opening 22 of the recording tape cartridge 14 (the case 16) accommodated in the cartridge accommodation portion 32, for sucking a distal end of the leader tape 24 (i.e., position A shown in FIG. 6), and a position that is passed through the slit 42A of the upper flange 42 of the winding reel 34, which is in the initial state, at which position a rearward portion of the sucked portion of the leader tape 24 is wound round the outer peripheral face 46A (position B shown in FIG. 6).

Figure 5:
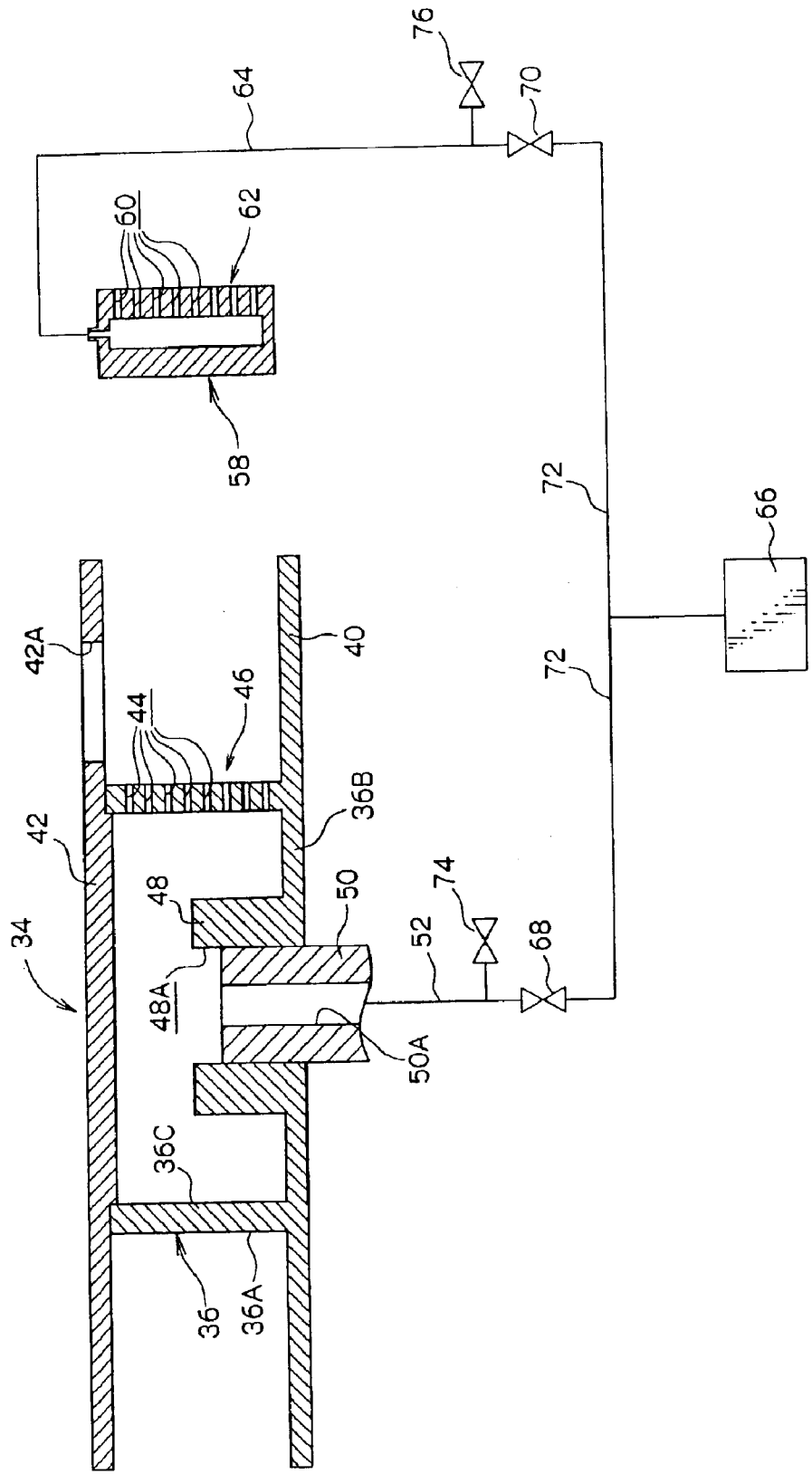
FIG. 5 is a control system diagram showing connections between the winding reel and the suction-retention member, which structure the tape drive device relating to the embodiment of the present invention, and a suction device.

As shown in FIG. 5, the suction piping 52, which communicates with the reel hub 36, and the suction piping 64, which communicates with the suction-retention member 58, are respectively connected to the suction device 66, which is a vacuum pump, an exhaust fan device or the like.

Specifically, an end portion of the suction piping 52, at a side thereof opposite to the side thereof at which the rotation shaft 50 is connected, is connected to one end portion of a solenoid valve 68, and an end portion of the suction piping 64, at a side thereof opposite to the side thereof at which the suction-retention member 58 is connected, is connected to one end portion of a solenoid valve 70. Respective other end portions of the solenoid valves 68 and 70 are connected to branched suction pipes 72, which are respectively connected to the suction portion of the suction device 66. The solenoid valves 68 and 70 usually close off communication of the suction piping 52 and suction piping 64 with the suction pipes 72. When the solenoid valve 68 or the solenoid valve 70 is operated, the solenoid valve 68 or 70 opens and the suction piping 52 or the suction piping 64 communicates with the suction pipes 72.

Respective one end portions of solenoid valves 74 and 76 are connected to the exterior (an atmosphere portion). Other end portions of the solenoid valves 74 and 76 are connected to intermediate portions of the suction piping 52 and suction piping 64. The solenoid valves 74 and 76 usually close off communication of the suction piping 52 and suction piping 64 with the exterior. When the solenoid valve 74 or the solenoid valve 76 is operated, the suction piping 52 or the suction piping 64 opens, and the suction piping 52 or 64 communicates with the exterior.

With the structure described above, if the leader tape 24 is located in a vicinity of the sucking portion 46 and the suction device 66 is operated in a state in which the solenoid valve 74 is closed and the solenoid valve 68 is open, air is sucked through the numerous through-holes 44 and the leader tape 24 is sucked to the outer peripheral face 46A of the sucking portion 46. In the same way, with this structure, if the leader tape 24 is located in a vicinity of the sucking portion 62 and the suction device 66 is operated in a state in which the solenoid valve 76 is closed and the solenoid valve 70 is open, air is sucked through the numerous through-holes 60 and the leader tape 24 is sucked to the sucking portion 62.

The suction states described above are maintained even if the solenoid valve 68 or 70 is closed and the suction device 66 ceases operation. If the solenoid valve 74 is operated, air enters into the suction piping 52 and the suction state of the leader tape 24 against the sucking portion 46 is released. If the solenoid valve 76 is operated, air enters into the suction piping 64 and the suction state of the leader tape 24 against the sucking portion 62 is released. In the case of a structure that cannot maintain a negative pressure state at a suction side when the suction device 66 has ceased operation, the solenoid valve 74 can be rendered unnecessary, by differentiating suction timings of the sucking portion 46 and the sucking portion 62, as illustrated in descriptions of operations below.

Thus, the sucking portion 46 (the numerous through-holes 44), the rotation shaft 50 (the suction path 50A), the suction piping 52 and the suction device 66 described above correspond to "sucking means" of the present invention.

Next, operation of the present embodiment will be described.

In the tape drive device 10 having the structure described above, when the recording tape cartridge 14 is loaded and accommodated in the cartridge accommodation portion 32 of the main body 30, or in association with this loading operation, the sliding door 20 of the recording tape cartridge 14 moves and opens up the opening 22.

Figure 6:
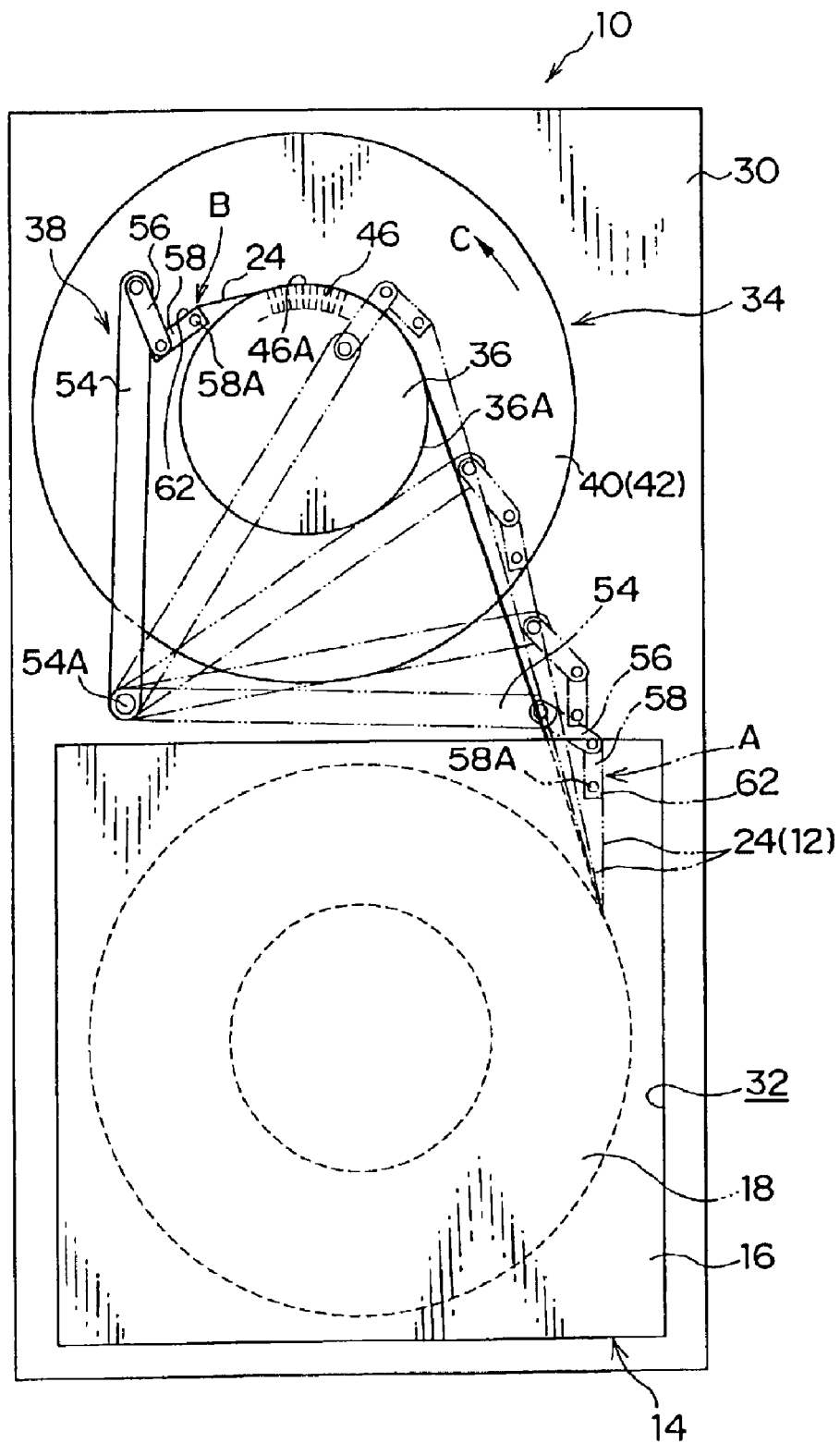
FIG. 6 is a plan view showing a process of guidance of a leader tape by the guiding means in the tape drive device relating to the embodiment of the present invention.

Then, the arm 54 of the guiding means 38 swings to the recording tape cartridge 14 side, and the suction-retention member 58 enters into the case 16 through the opening 22 (moves to the position A shown by imaginary lines in FIG. 6). When the sucking portion 62 of the suction-retention member 58 reaches a distal end vicinity of the leader tape 24 in the case 16, the solenoid valve 70 is operated so that the suction device 66 is communicated with the suction-retention member 58, and the suction device 66 is operated. As a result, the distal end of the leader tape 24 is sucked and retained at the sucking portion 62 of the suction-retention member 58.

In this state, when the arm 54 is swung in a direction away from the recording tape cartridge 14, the suction-retention member 58 suckingly holds the leader tape 24 while the guide pin 58A is guided in the cam groove, whereby the leader tape 24 is guided to the reel hub 36 of the winding reel 34.

Then, when the suction-retention member 58 reaches the position B shown in FIG. 6 and, as shown in FIG. 7 (in which the upper flange 42 is not shown), a portion of the leader tape 24 rearward of a location of the leader tape 24 that is sucked to the sucking portion 62 is wound around the sucking portion 46 of the reel hub 36 (the outer peripheral face 46A), the solenoid valve 68 is operated and the interior of the reel hub 36 is communicated with the suction device 66.

Because the suction device 66 is already operating, the leader tape 24 is sucked to the outer peripheral face 46A of the sucking portion 46. In this state, operation of the solenoid valve 68 is ended and, while this suction state is maintained, the suction device 66 ceases operation. However, this suction state may be maintained by continuing operation of the suction device 66.

When the reel hub 36 has sucked the leader tape 24 to the outer peripheral face 46A, operation of the solenoid valve 70 is ended and the solenoid valve 76 is operated. As a result, communication between the suction-retention member 58 and the suction device 66 is closed off, and air is introduced through the solenoid valve 76. Consequently, the suction-retention member 58 terminates holding, by suction, of the leader tape 24 and releases the leader tape 24. Then, the guiding means 38 swings the arm 54 back to the initial position.

Figure 8A:
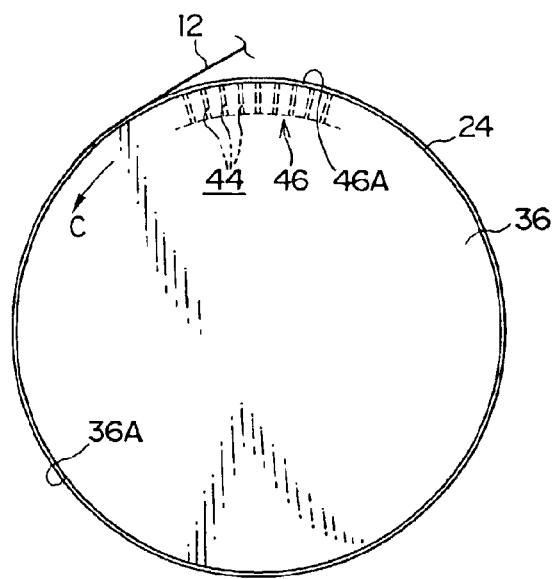
FIG. 8A is a sectional plan view showing a winding state of the leader tape on the reel hub which structures the tape drive device relating to the embodiment of the present invention.
Figure 8B:
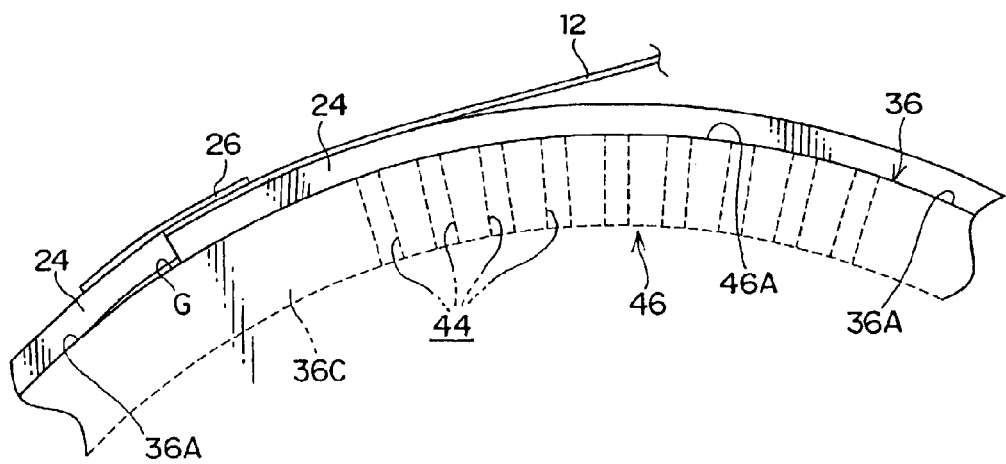
FIG. 8B is an enlarged sectional view of principal portions, showing the winding state of the leader tape on the reel hub which structures the tape drive device relating to the embodiment of the present invention.

When, in this state, the winding reel 34 (the reel hub 36) is driven to rotate in the direction of arrow C shown in FIGS. 6 and 8A, synchronous with the reel 18 of the recording tape cartridge 14 (the driving gear), the leader tape 24 is wound onto the outer peripheral surface 36A (including the outer peripheral face 46A) of the reel hub 36. When the leader tape 24 has been wound a single turn around the reel hub 36, the magnetic tape 12 is wound onto a winding surface formed by the leader tape 24, as shown in FIG. 8A. At this time, as shown in FIG. 8B, a slight gap G (with a maximum depth corresponding to the thickness of the magnetic tape 12) is formed between an end portion of the leader tape 24 that is connected to the magnetic tape 12 and the outer peripheral surface 36A of the reel hub 36.

The magnetic tape 12 is wound onto the winding surface (i.e., the reel hub 36) while being sequentially drawn out from the case 16. The magnetic tape 12 is guided along the predetermined tape path formed by movement of the aforementioned guide rollers, and recording of information or replaying of recorded information is implemented by the recording/replaying head (a magnetic head), which is disposed along the predetermined tape path.

When the magnetic tape 12 is to be wound back to the reel 18, the winding reel 34 and the reel 18 are driven to rotate in reverse. At this time, the solenoid valve 74 operates and air is introduced into the suction piping 52. Thus, sucking of the leader tape 24 against the sucking portion 46 is released. This release of suction may be carried out while the magnetic tape 12 is still being wound onto the reel hub 36 (particularly in a case in which the suction has been maintained by continuing operation of the suction device 66), after the magnetic tape 12 has been wound around the reel hub 36 a number of times (i.e., the magnetic tape 12 has achieved a state that is capable of reliably resisting pulling force of the magnetic tape 12 when holding (by suction) of the leader tape 24 by the sucking portion 46 has been released).

When the magnetic tape 12 that had been wound onto the reel hub 36 of the winding reel 34 has been completely unwound, the reel 18 alone is driven to rotate by precisely a predetermined amount, and the leader tape 24 is returned to the initial position thereof in the case 16. In this state, the tape drive device 10 closes the opening 22, or the opening 22 is closed while the tape drive device 10 ejects the recording tape cartridge 14 from the cartridge accommodation portion 32.

In this tape drive device 10, because the reel hub 36 can suck the leader tape 24 to the outer peripheral face 46A of the sucking portion 46, the reel hub 36 can retain the leader tape 24 connected to the distal end of the magnetic tape 12 without, as in the prior art, accommodating a leader member such as a leader block or the like inside the reel hub.

Therefore, the reel hub 36 does not have to be provided with unnecessary projections and depressions, which cause steps, such as a recess portion or the like which opens in the outer peripheral surface 36A in order to accommodate and retain a leader member. Thus, the reel hub 36 can structure the winding surface for winding on the magnetic tape 12 only with the outer peripheral surface 36A (the outer peripheral face 46A), which is a smooth (discontinuity-free) circular circumferential surface. In other words, because there is no member that is inserted into the reel hub 36 and, together with the outer peripheral surface 36A of the reel hub 36, structures the winding surface, a step will not be caused in the winding surface onto which the magnetic tape 12 is wound by individual dimensional differences of the member, positioning accuracy or the like.

Accordingly, in the tape drive device 10 relating to the present embodiment, the winding surface of the reel hub 36, onto which the magnetic tape 12 is wound, can be structured without steps.

In addition, the circumferential length of the outer peripheral surface 36A of the reel hub 36 matches the length of the leader tape 24. Therefore, a position, in the circumferential direction of the reel hub 36, of the free end portion of the leader tape 24, which is wound onto the outer peripheral surface 36A of the reel hub 36 as described above, coincides with a position at which the end of the leader tape 24 is connected to the magnetic tape 12.

Therefore, a step due to thickness of the leader tape 24 in the actual winding surface for the magnetic tape 12, which is formed by the leader tape 24 wound on the reel hub 36, is substantially eliminated. In particular, because, as described above, the leader tape 24 does not enter into the reel hub 36 (does not cross the circumferential direction of the reel hub 36), the two ends of the leader tape 24 are brought face to face (without either being superposed or forming a gap therebetween), and any step due to the thickness of the leader tape 24 is excellently eliminated. Consequently, a step occurring at the actual winding surface in the present embodiment is restricted to a step corresponding to thickness of the splicing tape 26, as shown in FIG. 8B.

In the state in which a portion of the leader tape 24 is wound up on the outer peripheral face 46A of the sucking portion 46 by the guiding means 38, the reel hub 36 (the sucking means) sucks the portion of the leader tape 24 that is wound up, and thus the leader tape 24 is reliably sucked and retained.

Further, with the tape drive device 10 having the structure described above, because the guiding means 38 is provided with the suction-retention member 58 which suckingly holds the leader tape 24, the leader tape 24 can be sucked and retained by the suction of the suction-retention member 58 even if the leader tape 24 was not accurately positioned in the case 16. Thus, the tape drive device 10 can correspond excellently to any type of a recording tape cartridge that is provided with the leader tape as described above. In particular, because the guiding means 38 does not have to retain the leader tape 24 by engaging, hooking, gripping or the like, and thus does not require a high accuracy operation, structures can be made simpler and unneeded precision (machining accuracy of the respective components and assembly accuracy) can be relaxed, whereby a reduction in costs can be attained.

Further still, because the suction device 66 is used in common for the reel hub 36 (the sucking means) and the guiding means 38, the tape drive device 10 as a whole can be made smaller, and a reduction in costs can be expected.

Next, modified examples of the winding reel and the guiding means will be described. Components and portions that are substantially the same as in the embodiment described above are given the same reference numerals as in the above embodiment, and descriptions thereof are omitted.

Figure 10:
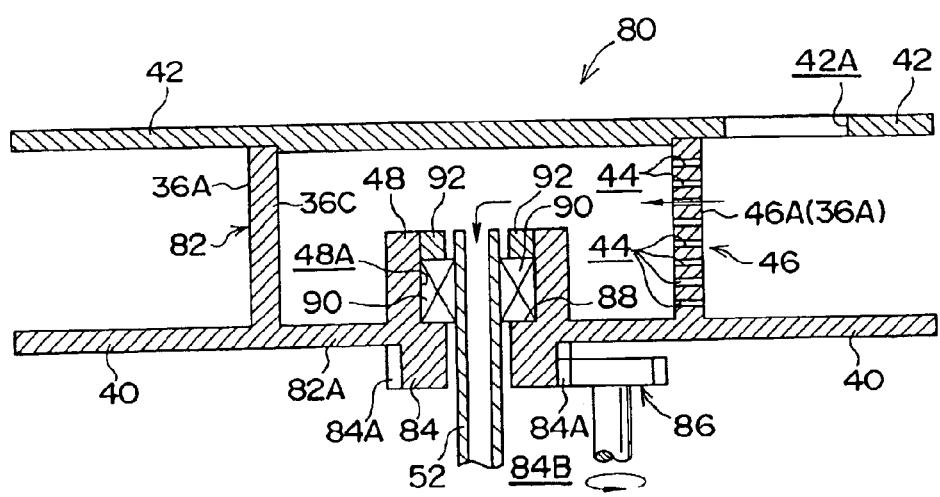
FIG. 10 is a sectional view, which corresponds to FIG. 3, showing a modified example of the winding reel which structures the tape drive device relating to the embodiment of the present invention.

First, a modified example of the winding reel is described, on the basis of FIG. 10. FIG. 10 shows a winding reel 80 relating to the modified example in a sectional view corresponding to FIG. 3. As shown in this drawing, the winding reel 80 is provided with a reel hub 82 in place of the reel hub 36. The reel hub 82 is formed in a tubular shape having a base, including the peripheral wall 36C at which the outer peripheral surface 36A and the sucking portion 46 (the outer peripheral face 46A) are formed.

However, at a base portion 82A of the reel hub 82, in addition to the boss portion 48, an idle shaft 84 is provided protruding to a side of the base portion 82A opposite to the side thereof at which the boss portion 48 is provided. A driven gear 84A is formed at an outer peripheral portion of the driven shaft 84. The driven gear 84A meshes with a driving gear 86, which transmits rotary force from the aforementioned driving motor. A through-hole 84B, which communicates with the boss hole 48A of the boss portion 48, is formed inside the driven shaft 84. A step portion 88, which faces upward, is formed at a boundary portion between the through-hole 84B and the boss hole 48A.

A bearing 90 is disposed in the boss hole 48A. The bearing 90 is hermetically (in an airtight manner) sandwiched and fixed between the step portion 88 and a pressure ring 92. The suction piping 52 is supported at the bearing 90 in an airtight state so as to be relatively rotatable with respect to the reel hub 82. That is, in the present embodiment, the sucking portion 46 (the numerous through-holes 44), the suction piping 52 and the suction device 66 correspond to the "sucking means" of the present invention.

All the same effects as in the embodiment described earlier are provided by a structure that is provided with the winding reel 80 (the reel hub 82) relating to the present modified example.

Although the suction piping 52 is connected at the base portion 82A of the reel hub 82 in the present modified example, the suction piping 52 may be relatively rotatably connected in an airtight manner at the upper flange 42, with the boss portion 48, the bearing 90 and the like being provided at the upper flange 42. Further, instead of the driven gear 84A provided at the outer peripheral portion of the driven shaft 84, the structure may be provided with a gear formed at a lower end face of the base portion 82A (a driven gear similar to the reel gear of the reel 18).

Figure 11:
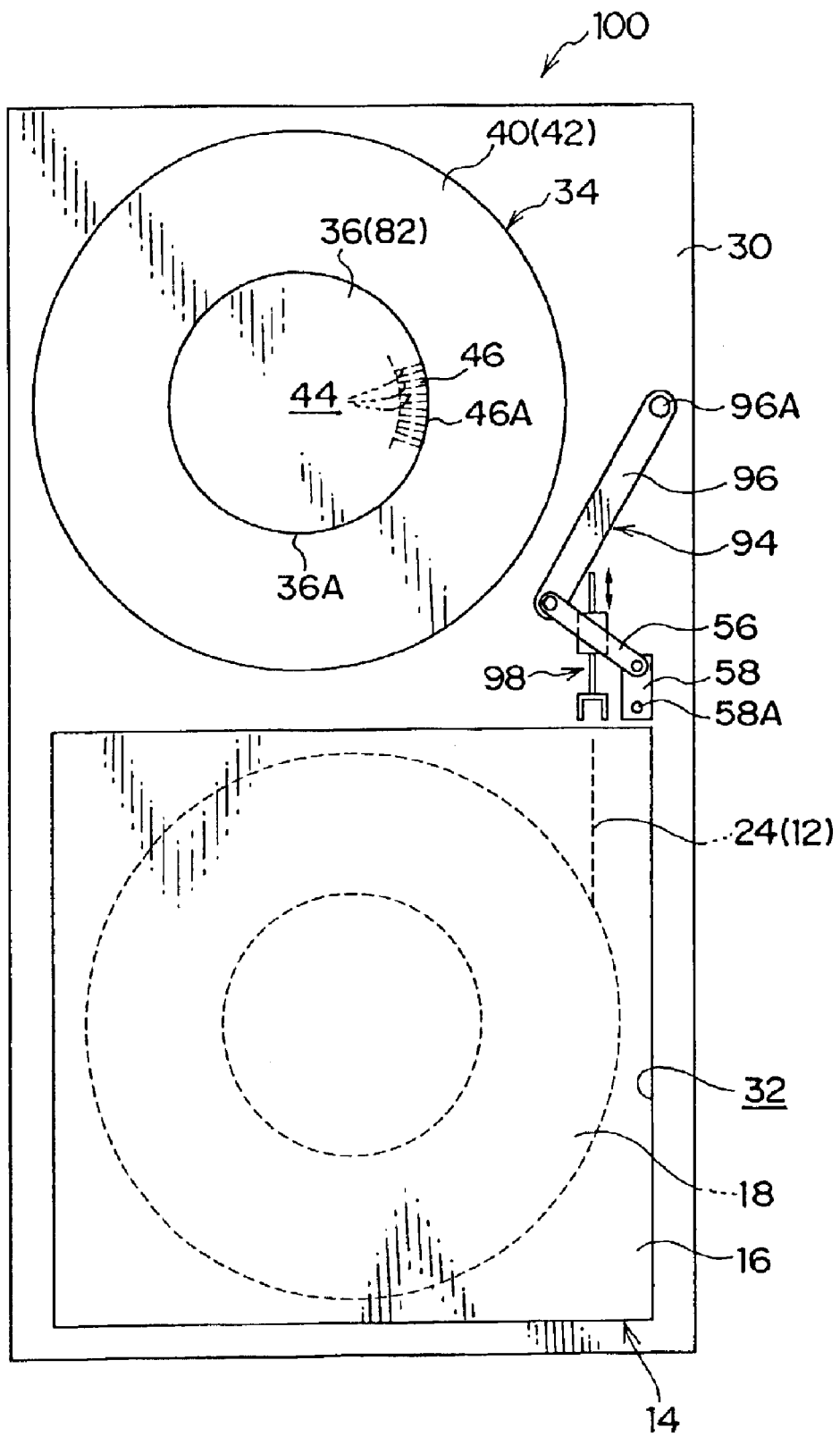
FIG. 11 is a plan view, which corresponds to FIG. 1, showing a modified example of the tape drive device relating to the embodiment of the present invention.

Next, a modified example of the guiding means and the like will be described on the basis of FIGS. 11 and 12. FIG. 11 shows a tape drive device 100, which is provided with guiding means 94 relating to the modified example in place of the guiding means 38, in a plan view corresponding to FIG. 1. In an initial state of the tape drive device 100 (prior to commencement of drawing out of the magnetic tape 12), the winding reel 34 is held at a position at which the outer peripheral face 46A of the sucking portion 46 thereof is 90° backward in the direction of arrow C, in terms of the phase angle, relative to the position at which the winding reel 34 in the embodiment described earlier is held (i.e., in this modified example, the outer peripheral face 46A of the sucking portion 46 faces to the right side of the paper in FIG. 11).

As shown in this drawing, the guiding means 94 is provided with an arm 96. A support shaft 96A is provided at one end portion of the arm 96, and the support shaft 96A is pivotally supported at the main body 30. The arm 96 is swung around the support shaft 96A by operation of an unillustrated driving mechanism. The arm 96 swings above the upper flange 42, and is structured such that the swinging path thereof does not interfere with the winding reel 34.

The suction-retention member 58 is connected to the other end portion of the arm 96 via the linking member 56. The suction-retention member 58 is capable of sucking the leader tape 24 at the sucking portion 62. The sucking portion 62 sucks a face of the leader tape 24 at a side thereof that is opposite to the side of the leader tape 24 that is sucked in the embodiment described earlier (i.e., the face that is at the outer side when the leader tape 24 is wound on the reel hub 36).

The tape drive device 100 is equipped with leader tape drawing out means 98. The leader tape drawing out means 98 advances into the opening 22 of the recording tape cartridge 14 that is accommodated in the cartridge accommodation portion 32, grips the distal end of the leader tape 24, and draws the leader tape 24 substantially straight out by precisely a determined amount (for example, around 30 mm along a side wall of the case 16).

Then, the arm 96 swings, so that the guide pin 58A is guided in the unillustrated cam groove, and the suction-retention member 58 moves along a predetermined path. Specifically, the suction-retention member 58 is usually positioned at an initial position shown in FIG. 11. The suction-retention member 58 can then be moved, by swinging of the arm 96, to a position for sucking the distal end of the leader tape 24 that has been drawn out by the leader tape drawing out means 98 (the position shown by imaginary lines in FIG. 12), and a position (the position shown by actual lines in FIG. 12) at which a distal end portion of the sucked leader tape 24 abuts against the outer peripheral face 46A of the winding reel 34, which is in the initial state thereof.

Although the form of the slit 42A of the upper flange 42, which corresponds to the movement path of the suction-retention member 58, is different from the embodiment described earlier, this is not shown in the drawings. Furthermore, the leader tape drawing out means 98 is not shown in FIG. 12.

In the tape drive device 100 relating to the present modified example, when the opening 22 of the recording tape cartridge 14 accommodated in the cartridge accommodation portion 32 is opened, the leader tape drawing out means 98 advances into the opening 22, grips the distal end of the leader tape 24, and draws the leader tape 24 out from the case 16 by precisely the predetermined amount. Thereafter, the leader tape drawing out means 98 releases the gripping state of the leader tape 24, and withdraws to a position so as not to interfere with the guiding means 94 (the suction-retention member 58).

Figure 12:
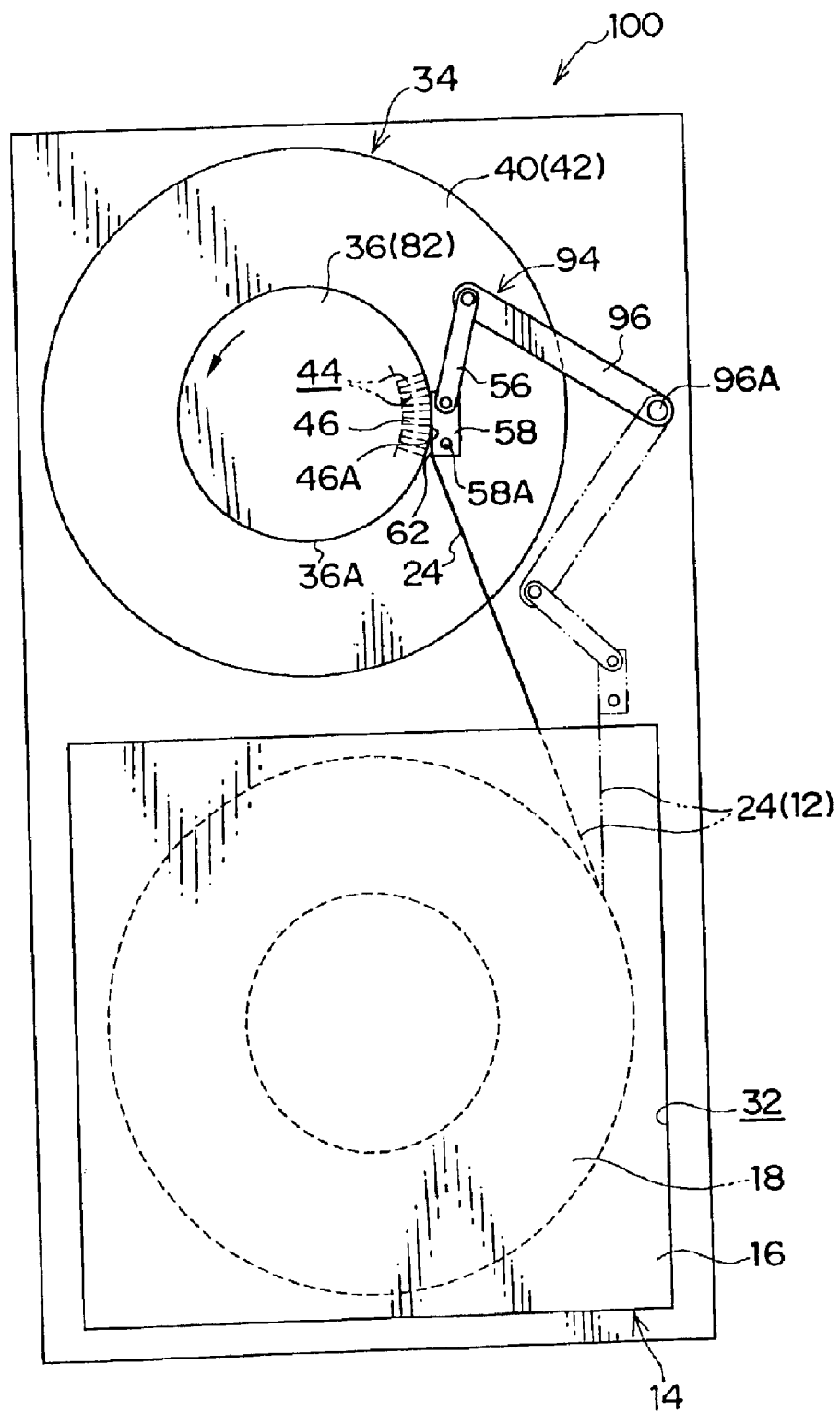
FIG. 12 is a plan view showing a process of guidance of a leader tape by guiding means in the modified example of the tape drive device relating to the embodiment of the present invention.

Then, the arm 96 of the guiding means 94 swings, and the suction-retention member 58 reaches the position shown by imaginary lines in FIG. 12. The solenoid valve 70 is then operated and the distal end of the leader tape 24 is sucked to the sucking portion 62 of the suction-retention member 58. In this state, the arm 96 is further swung, and the suction-retention member 58 reaches the position shown by solid lines in FIG. 12, substantially opposing the outer peripheral face 46A of the reel hub 36. Thereafter, the distal end portion of the sucked leader tape 24 is abutted against the outer peripheral face 46A.

Hence, the solenoid valve 68 is operated and communicates the interior of the reel hub 36 with the suction device 66. Because the suction device 66 is already operating, the leader tape 24 is sucked to the outer peripheral face 46A of the sucking portion 46. Subsequent operations are completely the same as in the embodiment described earlier. Accordingly, descriptions thereof are omitted.

Thus, in a case that the tape drive device 100 is provided with the guiding means 94 and the leader tape drawing out means 98 relating to the present modified example instead of the guiding means 38, the same effects as with the tape drive device 10 having the structure described earlier are obtained, except that the leader tape 24 is wound round at the outer peripheral face 46A by the guiding means 38.

In the tape drive device 100, because the face of the leader tape 24 that is at the outer side when the leader tape 24 is wound onto the reel hub 36 is sucked by the sucking portion 62 of the suction-retention member 58, the guidance path of the guiding means 94 can be shortened (design for a minimal path length is enabled), and a reduction in size can further be facilitated.

The present invention is not limited to the structures illustrated in the embodiment and modified examples described above. Structures in which the principal elements illustrated above are suitably combined (or substituted) can be used. Thus, for example, the leader tape drawing out means 98 may be provided in the tape drive device 10 that is provided with the guiding means 38, or the guiding means 94 of the tape drive device 100 may be structured such that the suction-retention member 58 advances into the case 16 through the opening 22 to suck the leader tape 24.

Moreover, the embodiments and modified examples described above are preferably structured such that the suction device 66 is used in common for the reel hub 36 or 82 and the suction-retention member 58. However, the present invention is not limited thus. The reel hub 36 or 82 and the suction-retention member 58 may be structured to be connected to separately provided suction devices 66. In such a case, if, for example, the suction devices 66 have structures which cannot maintain negative pressure states at suction sides thereof when operation thereof has ceased, the solenoid valves 68, 70, 74 and 76 can be rendered unnecessary.

Furthermore, the embodiments and modified examples described above are preferably structured such that the guiding means 38 or 94 is provided with the suction-retention member 58 for sucking the leader tape 24. However, the present invention is not limited thus. For example, the guiding means 38 or the like may have a structure that is provided with a retaining member which grips, hooks onto, engages with or otherwise retains the leader tape 24 instead of the suction-retention member 58. In particular, in a structure that is provided with the guiding means 38 in which a portion of the leader tape 24 that is retained is different from a portion of the leader pin 24 that is sucked by the sucking portion 46 of the reel hub 36, alterations to the retaining member of another type than described above are easy. Obviously, the means for moving the suction-retention member 58 of the guiding means 38 or 94 is not limited to the arm 54 or 96 and the like.

Further again, in the embodiment and modified examples described above, the recording tape cartridge 14 has a structure wherein the leader tape 24 has a constant width. However, the present invention is not limited thus. For example, a structure in which one or each of width direction ends of the distal end of the leader tape 24 is provided with a tab portion (for example, a portion for positioning, holding or the like in the case 16, or for hooking, engaging or the like with the aforementioned retaining member) is also possible. That is, it is sufficient that the leader tape 24 employed in the tape drive device 10 or 100 has constant thickness. Moreover, that thickness is not limited to the thicknesses in the embodiment and modified examples described above.

Further yet, the embodiments and modified examples described above have been structured with the recording tape cartridge 14 that is utilized at the tape drive device 10 or 100 employing the magnetic tape 12 as a recording tape. However, the present invention is not limited thus. It is sufficient that the recording tape is one of long tape-form information recording/replaying media which can record information and replay information that has been recorded. Of course, the tape drive device 10 relating to the present invention can be applied to any recording tape cartridge that employs recording tape of any kind of recording/replaying system.

The tape drive device relating to the present invention as described above has the excellent effect of enabling a winding surface of a reel hub, at which a recording tape is wound, to have a structure without a step.

What is claimed is:

1. A tape drive device for winding a recording tape with a free end on a reel hub and carrying out at least one of recording of information on the recording tape and replaying of information that has been recorded on the recording tape, the tape drive device comprising:

guiding means for guiding a tape-form leader portion to an outer peripheral surface of the reel hub, the leader portion being provided at the free end of the recording tape; and sucking means provided at the reel hub, the sucking means being capable of sucking the leader portion to the outer peripheral surface, the sucking means comprising a plurality of through-holes, wherein the guiding means comprises a retaining member capable of retaining the leader portion, and a moving member which supports the retaining member and moves the retaining member along a predetermined path to a portion of the outer peripheral surface of the reel hub at which the through-holes are formed.

2. The tape drive device of claim 1, wherein the plurality of through-holes are formed in a peripheral wall of the reel hub, the peripheral wall serving as a recording tape winding surface, and the sucking means further comprises: suction piping; a suction path connecting the reel hub and the suction piping so as to enable passage of air therebetween; and a suction device connected to the suction piping.

3. The tape drive device of claim 2, further comprising a hollow rotation shaft connected to a central portion of the reel hub for rotating the reel hub, wherein the rotation shaft includes at least a portion of the suction path.

4. The tape drive device of claim 2, further comprising a rotation shaft connected to a central portion of the reel hub, wherein the suction path is provided through a bearing at a centre of the rotation shaft.

5. The tape drive device of claim 1, wherein the retaining member comprises a suction-retention member which retains the leader portion by suction.

6. The tape drive device of claim 5, wherein the suction-retention member is connected to the suction device.

7. The tape drive device of claim 1, further comprising a structure in which, when the retaining member, while retaining the leader portion, has been moved by the moving member to the portion of the reel hub peripheral wall at which the through-holes are formed, suction is performed by the suction device and the leader portion is sucked at the reel hub by suction through the through-holes.

8. The tape drive device of claim 7, wherein the reel hub, the suction path and the suction piping are connected to the suction device so as to be in a substantially airtight state at a time when the through-holes are closed off.

9. The tape drive device of claim 8, further comprising a valve which is provided at the suction piping and adapted such that the suction piping is closed off when the leader portion is sucked at the reel hub.

10. The tape drive device of claim 1, wherein a length of the leader portion is set to a length the same as an outer circumference of the reel hub.

11. A tape drive device for winding a recording tape with a free end on a hollow cylindrical-form reel hub and carrying out at least one of recording of information on the recording tape and replaying of information that has been recorded on the recording tape, the tape drive device comprising:

guiding means for guiding a tape-form leader portion to an outer peripheral surface of the reel hub, the leader portion being provided at the free end of the recording tape; and sucking means provided at the reel hub, the sucking means being capable of sucking the leader portion to the outer peripheral surface;

wherein the sucking means includes: at least one through-hole formed in a peripheral wall of the reel hub, the peripheral wall serving as a recording tape winding surface; a suction device; and suction piping connecting the reel hub and the suction device so as to enable passage of air therebetween, and wherein a length of the leader portion is set to a length the same as an outer circumference of the reel hub; and wherein the guiding means comprises a retaining member capable of retaining the leader portion, and a moving member which supports the retaining member and moves the retaining member along a predetermined path to a portion of the outer peripheral surface of the reel hub at which the at least one through-hole is formed.

12. The tape drive device of claim 11, wherein the sucking means further comprises a suction path which connects the reel hub and the suction piping so as to enable passage of air therebetween.

13. The tape drive device of claim 12, further comprising a hollow rotation shaft connected to a central portion of the reel hub for rotating the reel hub, wherein the rotation shaft includes at least a portion of the suction path.

14. The tape drive device of claim 12, further comprising a rotation shaft connected to a central portion of the reel hub, wherein the suction path is provided through a bearing at a centre of the rotation shaft.

15. The tape drive device of claim 11, wherein the retaining member comprises a suction-retention member which retains the leader portion by suction.

16. The tape drive device of claim 15, wherein the suction-retention member is connected to the suction device.

17. The tape drive device of claim 11, further comprising a structure in which, when the retaining member, while retaining the leader portion, has been moved by the moving member to the portion of the reel hub peripheral wall at which the at least one through-hole is formed, suction is performed by the suction device and the leader portion is sucked at the reel hub by suction through the at least one through-hole.

* * * * *